M. J. McCULLOUGH.
Steam-Cooker.
No. 197,649. Patented Nov. 27, 1877.
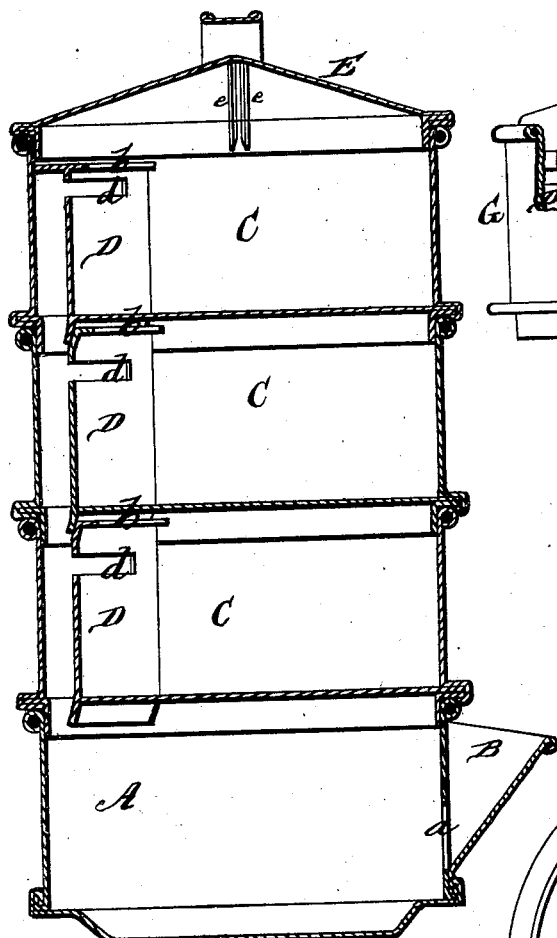
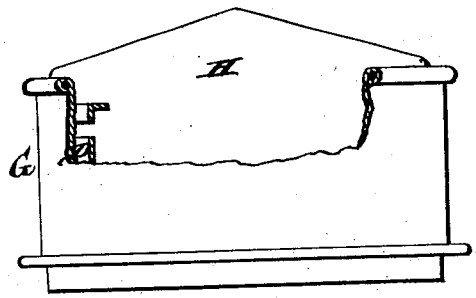
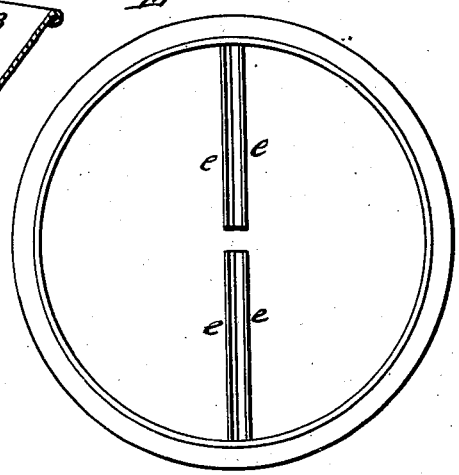
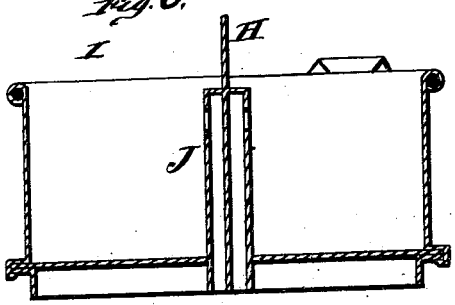
WITNESSES INVENTOR.
Mary J. McCullough.
ATTORNEYS.

UNITED STATES PATENT OFFICE.

MARY J. McCULLOUGH, OF LAWRENCE, KANSAS.

IMPROVEMENT IN STEAM-COOKERS.

Specification forming part of Letters Patent No. 197,649, dated November 27, 1877; application filed October 13, 1877.

*To all whom it may concern:*

Be it known that I, MARY J. McCULLOUGH, of Lawrence, in the county of Douglas and State of Kansas, have invented a new and valuable Improvement in Steam-Cookers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical section of my steam-cooker. Fig. 2 is a part-sectional view of a portion of my steam-cooker. Fig. 3 is a vertical sectional view, and Fig. 4 an inside view, of the cover.

My invention relates to that class of steam-cookers in which steam is conducted from the boiler or bottom vessel through a continuous channel into the various vessels placed upon the boiler; and it consists in the construction and arrangement of parts, as will be hereinafter more fully set forth.

The annexed drawing, to which reference is made, fully illustrates my invention.

A represents the bottom vessel or steam-generator, containing water to generate steam, and is to be placed on the stove. On the outside of the generator A is a hopper or funnel, B, with an opening, *a*, into the generator for supplying the same with air and water.

C C represent a series of vessels or food-receivers, all of the same size, and fitting steam-tight one on top of the other, so that each one may be taken out. Each vessel C is provided on the inside with a concave box, D, constructed at one side of the vessel, in such manner that a section of the side of the vessel forms one side of the box, and said box has a long narrow slot, *a*, near the top, opening into the vessel. These boxes form a continuous conductor for the hot air and steam to pass from the generator A to the top vessel, while the slots *a* allow such hot air and steam to escape into each vessel. Above each slot *a* is an inwardly-projecting flange, *b*, to control the current of hot air and steam.

By this construction of the parts, as shown and described, the various articles of food are cooked with hot air and steam combined, thus making the food drier and more palatable, and all the juices, flavor, and aroma of the food are retained without becoming mixed or passing from one vessel to another.

E is the cover or top, made to fit any one of the vessels C, and is conical in form, as shown.

G represents a food-receiver, with concave box D for the passage of steam; but this receiver is provided with a central vertical partition, H, running from the center of the concave box or steam-conductor, said partition fitting steam-tight between flanges *e e* on the inside of the cover E. By this means two kinds of food may be cooked at the same time in one food-receiver.

Instead of the concave box D, I provide one food-receiver, I, with a narrow oblong box or steam-conductor, J, in the center, with the partition H running up through the center of the same, leaving long narrow slots running on each side of the box, near the top. This box or conductor J operates as a hot-air and steam conductor. This food-receiver is intended to be used alone, directly on top of the steam-generator.

What I claim as new, and desire to secure by Letters Patent, is—

1. The food-receiver G, provided with concave slotted box D and central partition H, in combination with the cover E, having flanges *e e*, substantially as and for the purposes set forth.

2. The food-receiver I, provided with the central box or conductor J, with partition H, substantially as and for the purposes set forth.

In testimony that I claim the above I have hereunto subscribed my name in the presence of three witnesses.

MARY JANE McCULLOUGH.

Witnesses:
MAHLON H. NEWLIN,
AQUILA J. REID,
JOHN N. CORBIN.